March 19, 1963  A. B. J. CLARK  3,082,139
METHOD OF MOUNTING ELECTRICAL RESISTANCE STRAIN GAGE
Filed Dec. 15, 1959
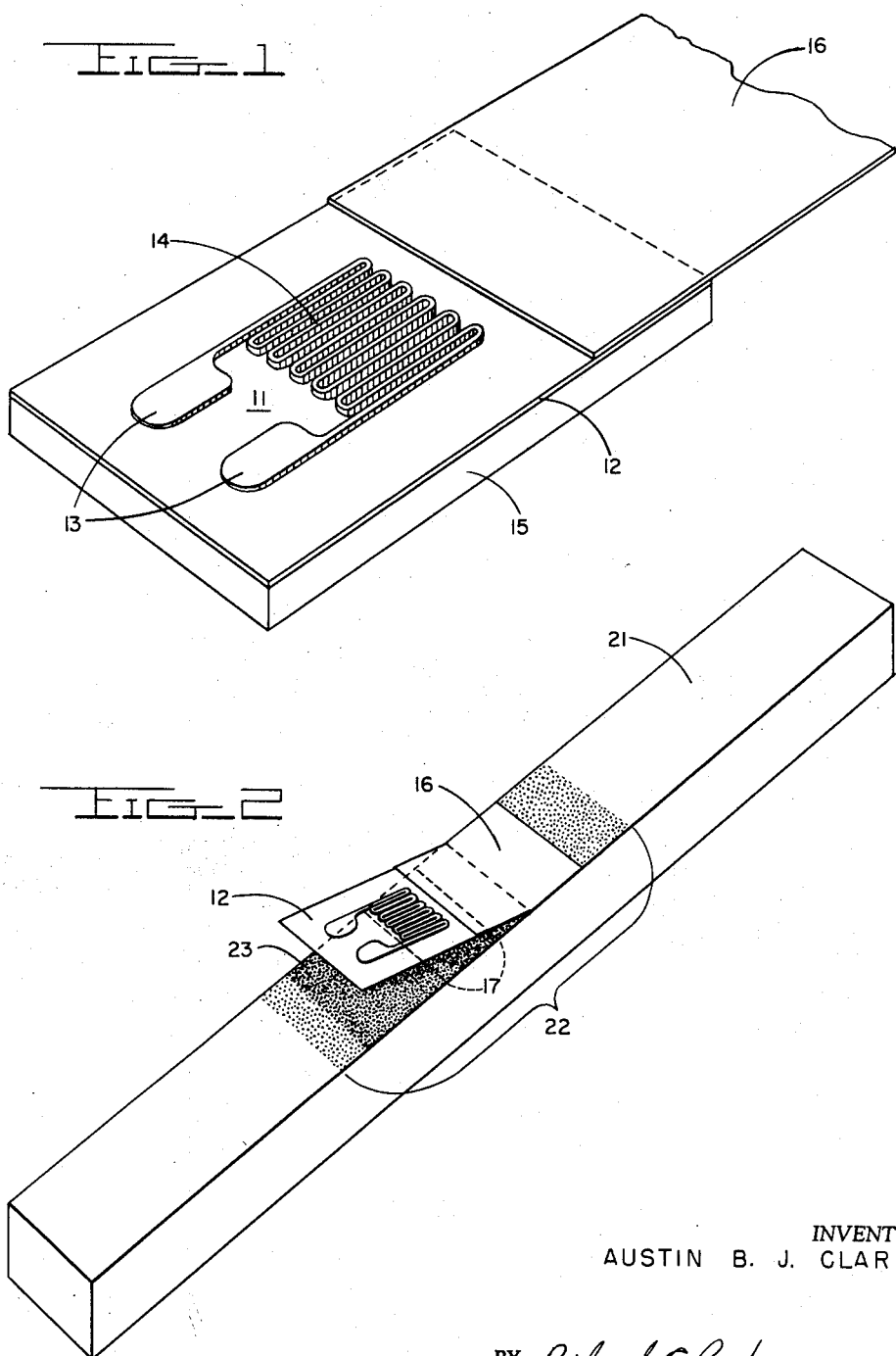
INVENTOR
AUSTIN B. J. CLARK
BY *Richard C. Reed*
ATTORNEY United States Patent Office 3,082,139
Patented Mar. 19, 1963

3,082,139
METHOD OF MOUNTING ELECTRICAL
RESISTANCE STRAIN GAGE
Austin B. J. Clark, Oxon Hill, Md.
(6371 Oxon Hill Road SE., Washington 21, D.C.)
Filed Dec. 15, 1959, Ser. No. 859,823
1 Claim. (Cl. 156—153)
(Granted under Title 35, U.S. Code (1952), sec. 266)

The invention described herein may be manufactured and used by or for the Government of the United States of America for governmental purposes without the payment of any royalties thereon or therefor.

The present invention relates to mounting strain gages on test surfaces and more particularly to mounting plastic-backed metal foil strain gages on metals or other materials.

When a plastic-backed foil gage is to be used to determine some of the properties of a metal it is essential that the foil gage be mounted securely on the metal surface and adhere firmly thereto throughout the test. The practice of mounting plastic-backed foil gages through use of a plastic cement comprising a plastic and a hardener has been acceptable for static tests but has failed to provide the firm adhesion necessary in dynamic tests on materials other than a plastic to which the plastic cement will adhere. Paper-backed foil strain gages have been adequately mounted with nitrocellulose cement or similar cements primarily because the solvent in the cement could evaporate through the paper; however, a serious disadvantage of such mountings is the excessive time required for the solvent to evaporate. The present invention avoids the disadvantages of prior methods of mounting metal foil strain gages and provides additional advantages, some of which are indicated in the following specification.

Accordingly, it is an object of the present invention to provide a method of mounting foil test gages that will result in firm adherence throughout the testing of a material.

Another object of this invention is to provide a method of mounting foil test gages on metallic surfaces wherein plastic-backed electrical resistance elements may be firmly adhered to the test surface and static and dynamic tests conducted as soon as the resistance elements have been mounted thereon.

Other objects and advantages will be apparent from the following description of the illustrated embodiment of the invention, and the novel features will be particularly pointed out hereinafter in connection with the appended claim.

In the accompanying drawings:

FIG. 1 is an isometric view of a strain gage;

FIG. 2 is an isometric view of one embodiment of the invention.

In FIG. 1, the strain gage 11 is shown as received from the manufacturer with the gage mounted on epoxy resin backing 12 and the resin in turn mounted on flexible support 15. The strip of gummed tape 16 is applied to resin backing 12 prior to mounting the gage, care being exercised that gummed tape 16 does not cover any portion of strain gage 11.

Referring now to the embodiment of the invention illustrated in FIG. 2, metallic test specimen 21 is cleaned and roughened in the surface area indicated at 22 and marked by transverse lines 17 to indicate where measurements are to be made and thus where the strain gage must be positioned. The test specimen is then coated in the prepared area with nitrocelluulose cement from which the solvent will readily escape, such as Duco or SR-4 strain gage cement, after which the cement is allowed to dry. The coated area may be heated slightly to facilitate the drying process. Tabs 13 are provided for attachment of lead wires. After flexible support 15 is removed the strain gage is then positioned between the transverse lines 17 and gummed tape 16 is adhered to test specimen 21. Next, the tape 16 is folded back so that the strain gage and epoxy resin backing 12 to which it is attached are disposed above the test specimen a sufficient distance to permit coating the epoxy resin on its surface nearest the test specimen with the hardener of a contact cement such as Eastman 910 cement. With the gummed tape still folded back and after coating the epoxy resin with the hardener, the liquid plastic of the contact cement is applied in the shaded area indicated at 23, which is the area where the gage will be positioned upon smoothing over of the epoxy resin backing by finger pressure. It is noted that application of the elements of the contact cement may be reversed with the liquid plastic applied to the strain gage and the hardener to the nitrocellulose cement. The smoothing of the epoxy resin by finger pressure after either application of liquid plastic and hardener is sufficient to cause a firm bond between the epoxy resin and the nitro-cellulose cement, this bond being entirely adequate to withstand dynamic loading such as that created by having a projectile strike one end of the test specimen.

It will be appreciated that although the illustrated embodiment relates to the application of an electrical resistance type of metal foil strain gage to a metal surface, the method may be used to firmly apply wire strain gages or other relatively thin and delicate objects to surfaces. Although drying of the nitrocellulose cement may be accelerated if desired by gentle heating, it is noted that neither a lengthy drying process such as baking nor the application of excessive pressure are required preparatory to conducting the strain tests. Thus, a variety of strain gages may be applied through use of contact cement after the test specimen is first coated wtih nitrocellulose cement or a fast-drying cement having similar ability to withstand dynamic loading.

Strain gages applied by the above method may be used immediately after the gages have been mounted, the gages may be placed accurately and firmly with no more than finger pressure, the metal foil type of gage may be used for dynamic tests as well as static tests, and the test specimens may be prepared in advance so as to be ready for mounting through the use of contact cement and liquid plastic at the time the tests are to be conducted.

It will be understood that various changes in the details and materials which have been herein described to explain the nature of the invention may be made by those skilled in the art within the principle and scope of the invention as expressed in the appended claim.

What is claimed is:

A method of preparing a metallic body for the application of a strain measuring device of the type having a thin delicate electrical resistance element adhered to a solid backing member which has a protective flexible support secured thereto and subsequently securing said strain measuring device to said metallic body such that a firm adhesion adequate to withstand dynamic loading is immediately obtained through the application of plastic cement and hardener which comprises the steps of:

(a) Cleaning and roughening an area on said metallic body of slightly larger size than that over which the measuring device is to be mounted;

(b) Coating the metallic body in the cleaned and roughened area with a nitrocellulose cement;

(c) Air drying the nitrocellulose cement coating while permitting the solvent therein to escape freely;

(d) Subsequently removing said flexible support from said solid backing member of said strain measuring device;

(e) Coating the solid backing member of said strain measuring device with a cement hardener on the side opposite from said thin delicate electrical resistance element;

(f) Coating the air dried nitrocellulose cement on said metallic body with a plastic cement;

(g) Immediately mounting the strain measuring device onto said metallic body with the hardener coated backing member placed onto the plastic cement coated nitrocellulose coating; and (h) Applying pressure to said measuring device to smooth out the cement and said strain measuring device whereupon a firm adhesion is immediately obtained between said backing member and the nitrocellulose cement coating on said metallic body and the metallic body is immediately ready for dynamic test.

References Cited in the file of this patent

UNITED STATES PATENTS

| | | |
|---|---|---|
| 2,626,338 | Mitchell | Jan. 20, 1953 |
| 2,899,658 | Bean | Aug. 11, 1959 |
| 2,927,878 | Beckman | Mar. 8, 1960 |
| 2,963,773 | Starr | Dec. 13, 1960 |

OTHER REFERENCES

Baldwin-Lima-Hamilton publication, published Feb. 1, 1959, Bulletin 4320, "Etched Foil Strain Gages," 6 pages.